United States Patent
Burgyan (10) Patent No.: US 6,219,262 B1
(45) Date of Patent: Apr. 17, 2001

(54) CIRCUIT AND METHOD FOR ADAPTIVE LEADING EDGE BLANKING IN PULSE WIDTH MODULATED CURRENT MODE SWITCHING POWER SUPPLY CONTROLLERS

(75) Inventor: Lajos Burgyan, Palo Alto, CA (US)

(73) Assignee: Semtech Corporation, Newbury Park, CA (US)

( * ) Notice: Subject to any disclaimer, the term of this patent is extended or adjusted under 35 U.S.C. 154(b) by 0 days.

(21) Appl. No.: 09/567,205

(22) Filed: May 8, 2000

(51) Int. Cl.$^7$ ............................. H02M 3/24; H02M 3/335
(52) U.S. Cl. ........................................... 363/97; 363/21.04
(58) Field of Search ........................... 363/16, 20, 21.01, 363/21.04, 21.05, 56.01, 56.09, 56.12, 95, 97, 131

(56) References Cited

U.S. PATENT DOCUMENTS

| | | | |
|---|---|---|---|
| 5,780,986 | * | 7/1998 | Shelton et al. .................. 318/432 |
| 5,859,757 | * | 1/1999 | Hanafusa et al. ................ 361/100 |
| 6,026,355 | * | 2/2000 | Rahman et al. .................. 702/189 |

* cited by examiner

*Primary Examiner*—Matthew Nguyen
(74) *Attorney, Agent, or Firm*—Thelen Reid & Priest LLP; David B. Ritchie (57) ABSTRACT

A current sensing device incorporated into the gate charge current path of the power transistor in a typical pulse-width modulated current mode switching power supply controller provides adaptive leading edge blanking of the current-sense waveform present in the feedback signal to prevent erroneous response in the feedback control circuitry and improve regulation of the power supply output voltage. A serial switch located within the current-sense feedback signal path is directly controlled by the current sensing device to open and close the signal path and generate a blanking interval which is optimally aligned to blank out or remove the leading edge spike in the current-sense waveform which corresponds to the gate charge current pulse that occurs during the turn-on transition of the power transistor. The optimal alignment of the blanking interval is an inherent feature of the current sensing device since the device utilizes the gate charge current pulse to define the timing of the opening and closing of the serial switch. Furthermore, the current sensing device is inherently responsive to variables such as the transistor's Miller capacitance or other manufacturing process and temperature related variations in gate-source capacitance which act to alter the width of the gate charge current pulse, and thus provides a blanking interval which adapts to or is independent of these variables. The width of the blanking interval automatically and dynamically adjusts to accommodate for changes in the leading edge spike of the current-sense waveform that result from the changing width in the gate charge current pulse.

12 Claims, 8 Drawing Sheets

CIRCUIT AND METHOD FOR ADAPTIVE LEADING EDGE BLANKING IN PULSE WIDTH MODULATED CURRENT MODE SWITCHING POWER SUPPLY CONTROLLERS

BACKGROUND OF THE INVENTION

1. Field of the Invention

The present invention is generally directed to voltage regulator circuits. More specifically, the present invention is directed to pulse-width modulated current mode controllers in switching regulators which commonly utilize leading edge blanking circuitry.

2. Background

Conventional current mode control circuits result in unique waveforms which can interfere with proper regulation of the output voltage in switching power supplies. A typical current mode control circuit commonly used in switching power supplies is represented by the block diagram circuit of FIG. 1A. In general, sensed current through an inductive load coupled to a power transistor is used for current mode control and cycle-by-cycle current limiting. The current mode control circuit has a voltage feedback loop 100 and a current-sense feedback loop 102 which work together to provide a regulated output voltage at $V_{out}$ 104. However, a gate charge current pulse ($I_{charge}$) 142 alters the leading edge of a current-sense waveform causing erroneous response in the peak current sensing feedback control circuitry and interferes with the proper regulation of the output voltage $V_{out}$ 104.

Figure 1A:
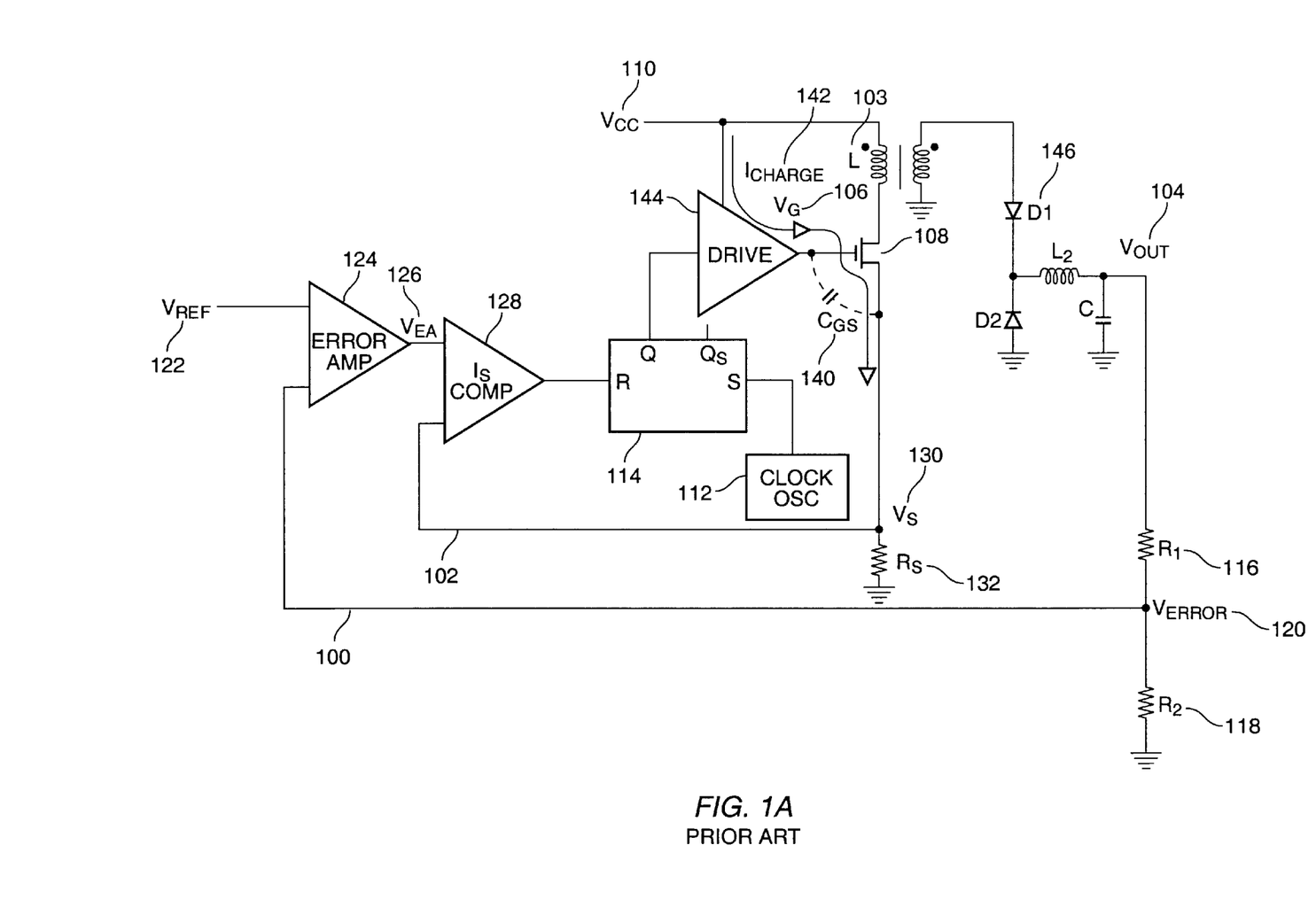
FIG. 1A shows a block diagram circuit of a typical current mode controller commonly used in switching power supplies in accordance with the prior art.

In the example current mode control circuit of FIG. 1A, the voltage and current-sense feedback loops 100, 102 control the pulse width of the gate drive voltage pulse $V_g$ 106 which opens and closes the power transistor main switch 108. The main switch 108 is typically a MOSFET switch that, in conjunction with inductor 103, facilitates the transfer of energy from the voltage input $V_{cc}$ 110 to the voltage output $V_{out}$ 104 by opening and closing in response to the drive pulse $V_g$ 106. The width of each drive pulse $V_g$ 106 is regulated by feedback through the voltage and current-sense feedback loops 100, 102 and determines the length of time during each clock cycle that the main switch 108 remains closed in order to build up energy in the inductor L 103. The longer the switch 108 is closed, the larger the transferred energy, resulting in a larger voltage output $V_{out}$ 104. Conversely, a shorter conduction interval of switch 108 results in a lower voltage output $V_{out}$ 104. The drive pulse $V_g$ 106 is generated by a constant-frequency clock 112 driving a latch 114. The output voltage $V_{out}$ 104 is thus regulated by the constant-frequency, pulse-width modulated voltage pulse $V_g$ 106.

In operation, the voltage and current-sense feedback loops 100, 102 modulate the width of the drive pulse $V_g$ 106 by continually monitoring the output voltage $V_{out}$ 104 and sensing the current flowing through the main switch 108. In the example current mode control circuit of FIG. 1A, 5 volts has been chosen as a typical value for $V_{out}$ 104. Resistors R1 116 and R2 118 make up a voltage divider which divides down $V_{out}$ 104 to provide a $V_{error}$ 120 voltage which is continually monitored within the voltage feedback loop 100. A voltage reference $V_{ref}$ 122 is set such that $V_{error}$ 120 is equal to $V_{ref}$ 122 when $V_{out}$ 104 is properly regulated to 5 volts. A typical value for $V_{ref}$ 122 is 1.25 volts, and thus the resistors R1 116 and R2 118 are selected to provide a value of 1.25 volts at $V_{error}$ 120 for a properly regulated $V_{out}$ 104 value of 5 volts. Any change in voltage at $V_{out}$ 104 results in a corresponding change in $V_{error}$ 120. The voltage difference between $V_{error}$ 120 and $V_{ref}$ 122 is then amplified by the error amplifier 124, resulting in an adjustment of the error amplifier 124 output voltage level $V_{ea}$ 126. During each clock cycle, a current-sense comparator 128 compares $V_{ea}$ 126 with the current-sense voltage $V_s$ 130, which is the voltage across a current-sense resistor $R_s$ 132 that rises as current flows through the closed main switch 108. The current-sense voltage $V_s$ 130 tracks the linearly increasing current through inductor L 103, and thus the energy being transferred from the voltage input $V_{cc}$ 110 to the voltage output $V_{out}$ 104, during each clock cycle as the main switch 108 is in a closed position due to the gate drive pulse $V_g$ 106. During each clock cycle, the gate drive pulse $V_g$ 106 keeps the main switch 108 closed until the current-sense voltage $V_s$ 130 rises to the level of $V_{ea}$ 126, at which point the current-sense comparator 128 resets the R-S flip-flop 114 which terminates the gate drive pulse $V_g$ 106 and opens the main switch 108 until the next clock cycle begins. Thus, the current-sense comparator 128 uses the monitored output voltage $V_{out}$ 104 and the sensed current through inductor L 103 to modulate the width of the drive pulse $V_g$ 106 and regulate $V_{out}$ 104.

Figure 1B:
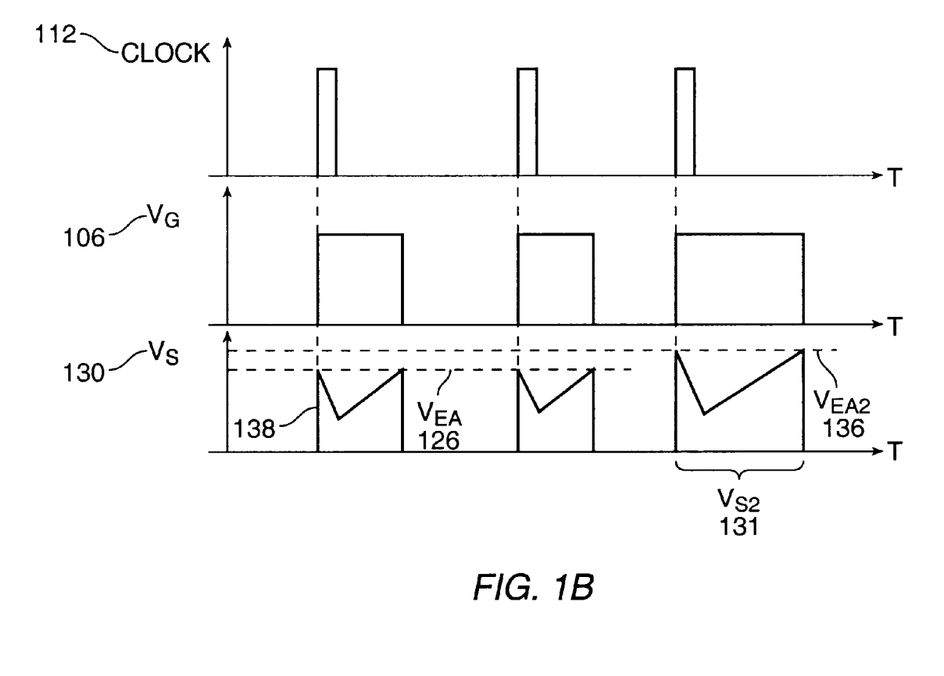
FIG. 1B shows the clock pulse, gate drive pulse $V_g$ and voltage $V_s$ waveforms representing the operation of the current mode control circuit of FIG. 1A in accordance with the prior art.

The operation of the current mode control circuit of FIG. 1A is more readily understood with reference to the clock pulse 112, the gate drive pulse $V_g$ 106 and the voltage $V_s$ 130 waveforms as shown in FIG. 1B. The gate drive pulse $V_g$ 106 begins with each clock pulse 112 and acts to close the main switch 108, causing a linear rise in current through inductor L 103 and a corresponding rise in the current-sense voltage $V_s$ 130 across the current-sense resistor $R_s$ 132. When $V_s$ 130 rises to the level pre-set by error amplifier 124 output voltage $V_{ea}$ 126, the current-sense comparator 128 resets the R-S flip-flop 114, terminating the gate drive pulse $V_g$ 106 which opens the main switch 108 and causes resistor $R_s$ 132 to pull $V_s$ 130 to ground until the next clock cycle begins.

A change in the error amplifier 124 output voltage $V_{ea}$ 126, as shown for example by $V_{ea2}$ 136 in FIG. 1B, is the result of the voltage feedback loop 100 of FIG. 1A responding to a drop in the output voltage $V_{out}$ 104. As is apparent from the $V_{s2}$ 131 waveform of FIG. 1B, a drop in the output voltage $V_{out}$ 104 results in a widening of the gate drive pulse $V_g$ 106 holding the main switch 108 closed, since $V_{s2}$ 131 must rise to a higher level in order to reach $V_{ea2}$ 136 and cause comparator 128 to reset the R-S flip-flop 114. Thus, the voltage and current-sense feedback loops 100, 102 work to correct the drop in output voltage $V_{out}$ 104 by holding the main switch 108 closed for a longer period of time during each clock cycle 112 so that more energy is transferred from the voltage input $V_{cc}$ 110 to the voltage output $V_{out}$ 104.

Figure 2A:
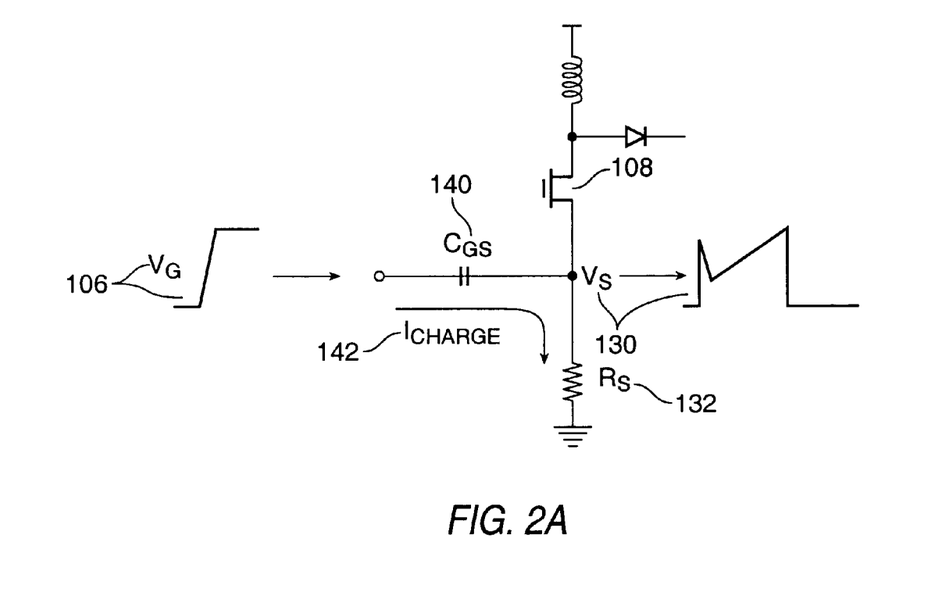
FIG. 2A is a partial illustration of the current mode control circuit of FIG. 1A showing how the gate drive pulse $V_g$ is differentiated by a series connection of the the gate-source capacitance $C_{gs}$ of the MOSFET switch and the current-sense resistor $R_s$, resulting in the leading edge spike.
Figure 2B:
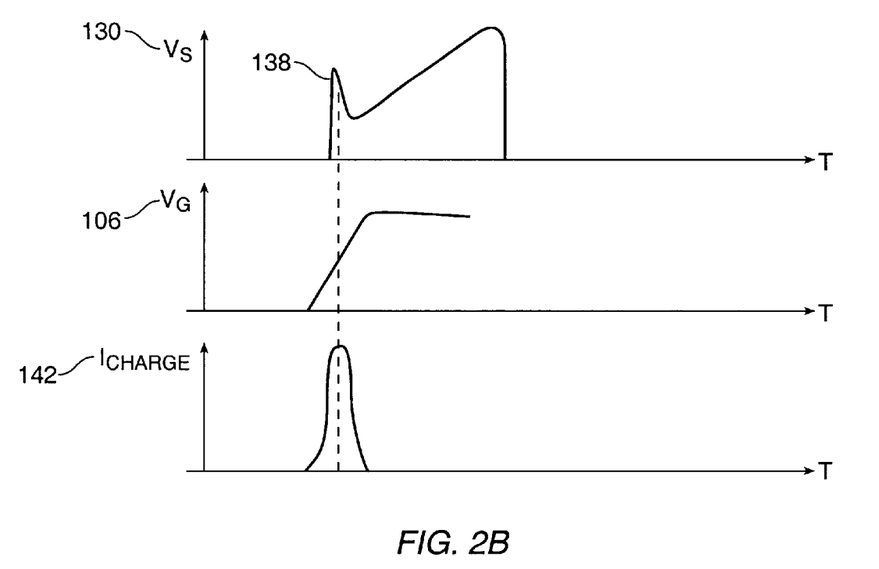
FIG. 2B shows the current and voltage waveforms which accompany the partial circuit illustration of FIG. 2A.

In addition to illustrating the operation of a typical current mode control circuit in a switching power supply, FIGS. 1A & 1B also illustrate the fundamental problem associated with using the current-sense voltage $V_s$ 130 waveform to control the complex current mode control circuitry. The current-sense voltage $V_s$ 130 waveform is not usable in its natural form to control the current mode control circuit because of the leading edge spike 138 which is apparent in the $V_s$ 130 waveform of FIGS. 1B & 2B. The partial circuit of FIG. 2A and accompanying waveforms of FIG. 2B illustrate how the gate drive pulse $V_g$ 106 is differentiated by a series connection of the the gate-source capacitance $C_{gs}$ 140 of the MOSFET switch 108 and the current-sense resistor $R_s$ 132 resulting in the leading edge spike 138. It is apparent from the waveforms of FIG. 2B that the leading edge spike 138 of the current-sense voltage $V_s$ 130 reaches its peak value at the same time that the gate charge current pulse $I_{charge}$ 142 ($I_{charge}$ path also illustrated in FIG. 1A) reaches its peak through the current-sense resistor $R_s$ 132 during the MOSFET switch 108 turn-on transition. Although several factors influence the leading edge spike 138 such as bias conditions in the driver circuitry 144, reverse recovery characteristics of the diode D1 146, transformer parasitics and the Miller effect, the main source of the leading edge spike 138 is the gate-source capacitance $C_{gs}$ 140 of the MOSFET switch 108. The value of the leading edge spike 138 in the current-sense voltage $V_s$ 130 can be high enough to intersect the voltage $V_{ea}$ 126 and cause the current-sense comparator 128 to incorrectly shut down the gate drive pulse $V_g$ 106, resulting in inaccurate regulation of $V_{out}$ 104.

Figure 3A:
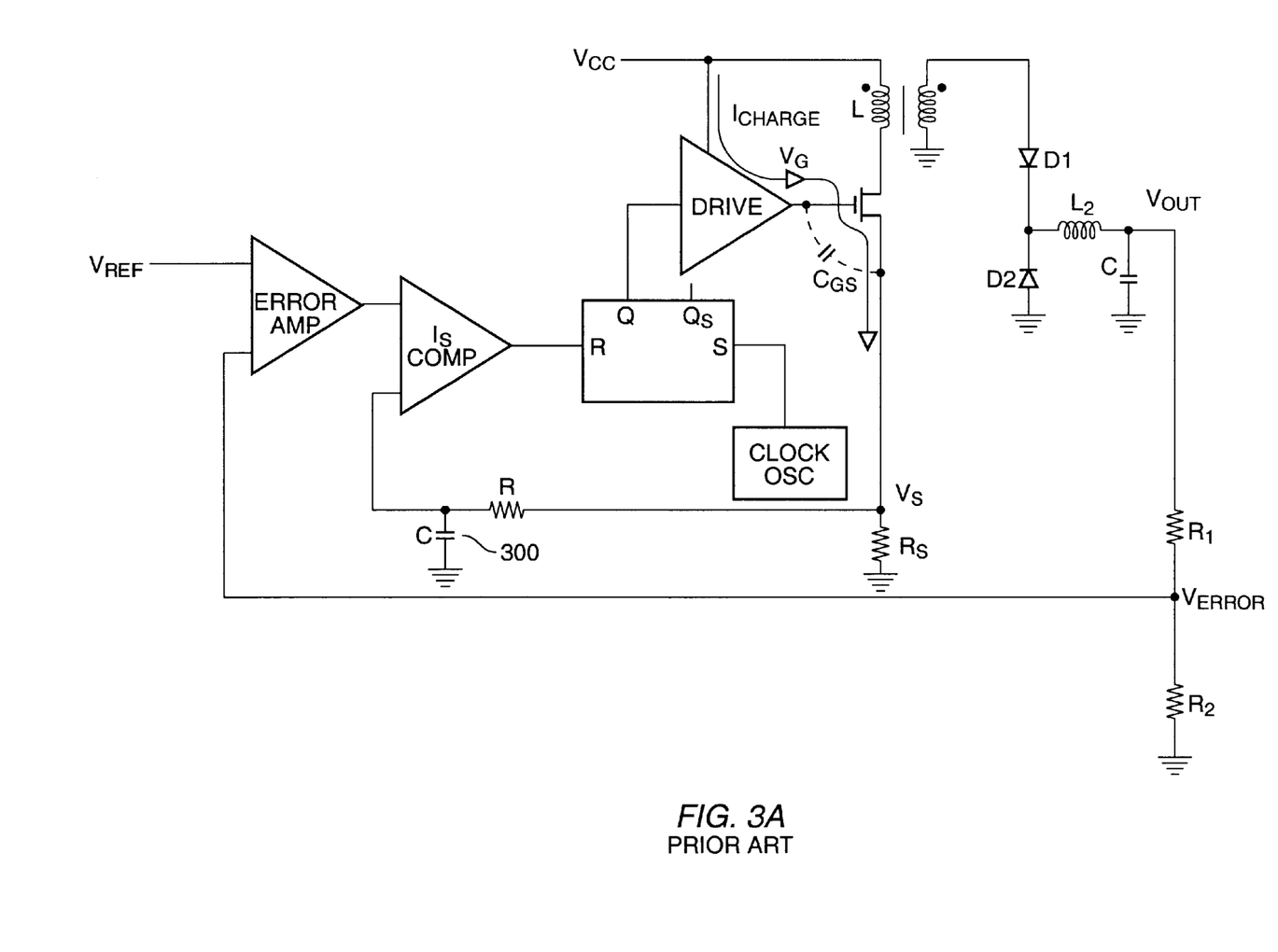
FIG. 3A shows a block diagram circuit of a typical current mode controller commonly used in switching power supplies which incorporates a typical frequency domain solution for removing the leading edge spike in accordance with the prior art.
Figure 3B:
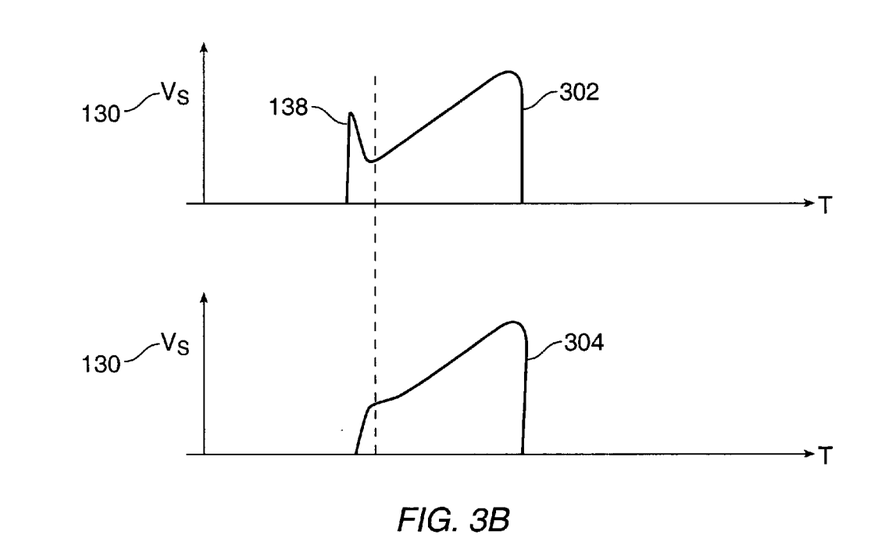
FIG. 3B shows the current-sense voltage waveform $V_s$ before and after application of the R-C filter frequency domain solution of FIG. 3A.

There are two basic solutions to this problem which both incorporate the use of leading edge blanking circuitry to blank out the leading edge spike 138. Approximately ninety percent of today's applications apply a frequency domain solution which utilizes a simple R-C low pass filter 300 as illustrated in FIG. 3A to remove the leading edge spike 138 from the current-sense voltage $V_s$ 130 waveform. The $V_s$ 130 waveform is illustrated in FIG. 3B both before 302 and after 304 the R-C filter 300. If a sufficient amount of filtering is applied, the leading edge spike 138 can be removed entirely. However, a fundamental problem with frequency domain leading edge blanking circuits is the difficulty in controlling the amplitude of the leading edge spike 138 with respect to the clock pulse 112 in the manufacturing process, which requires the designer to consider the worst case conditions in order to provide an adequate amount of filtering. Such a conservative design approach results in undesirably long propagation delay in the current-sense signal which is objectionable because it effects the control loop performance and adds to the reaction time of the cycle-by-cycle current limit circuits.

Figure 4A:
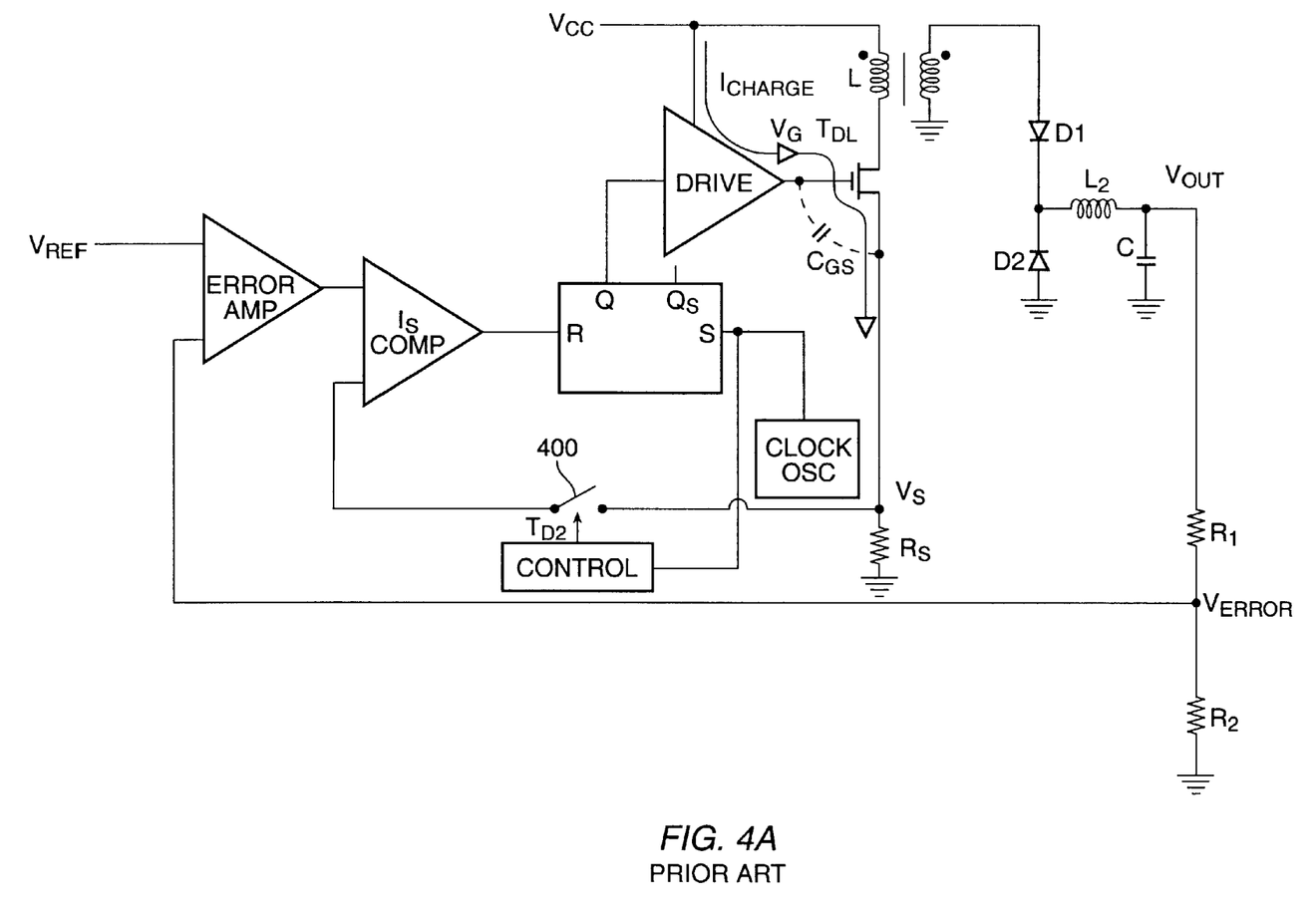
FIG. 4A shows a block diagram circuit of a typical current mode controller commonly used in switching power supplies which incorporates a typical time domain solution for removing the leading edge spike in accordance with the prior art.
Figure 4B:
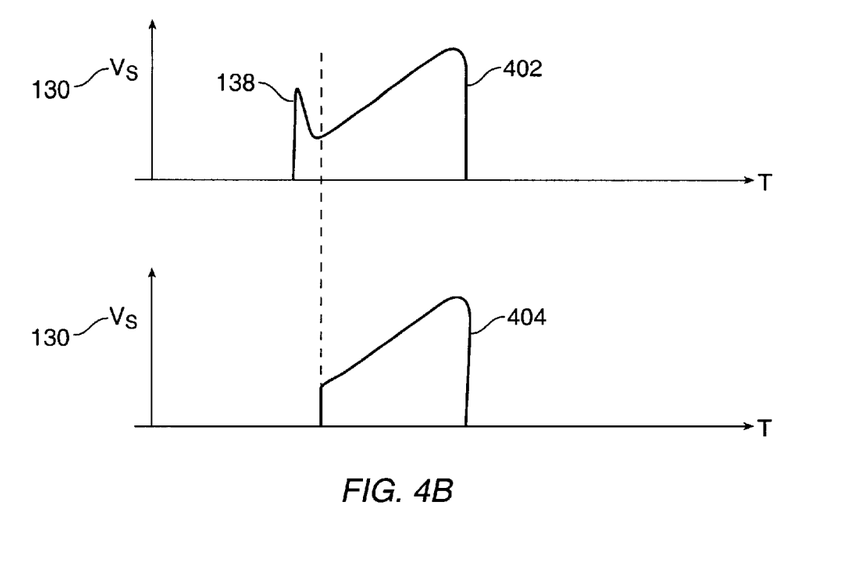
FIG. 4B shows the current-sense voltage waveform $V_s$ before and after application of the controlled switch time domain solution of FIG. 4A.

Another often used method to remove the leading edge spike 138 is a time domain solution which incorporates a series switch 400 in the current-sense feedback path as illustrated in FIG. 4A to interrupt the feedback signal prior to the arrival of the leading edge spike 138. After the leading edge spike 138 has passed, the switch 400 is closed to re-establish the feedback path. The $V_s$ 130 waveform is illustrated in FIG. 4B both before 402 and after 404 the blanking interval created by the switch 400. Although time domain leading edge blanking circuits are insensitive to magnitude variations in the leading edge spike 138, they are sensitive to the variations in its timing and width. If the leading edge spike 138 is wider than the blanking interval or if the blanking interval does not completely overlap the leading edge spike 138, full leading edge blanking cannot be achieved. Perfect synchronization of the blanking interval has been difficult to ensure in the prior art because of variations in propagation delays (td1 and td2 in FIG. 4A) in the manufacturing process. These variations and a further need to accommodate variations in the width of the leading edge spike 138 have required circuits in the prior art to be designed with an increased blanking interval. Such a conservative design approach results in undesirably long propagation delay in the current-sense signal which is objectionable because it effects the control loop performance and adds to the reaction time of the cycle-by-cycle current limit circuits.

Thus, leading edge blanking circuits in the prior art suffer disadvantages including a lack of proper alignment of the blanking interval with the leading edge spike, sensitivity to the leading edge spike width variations and sensitivity to the leading edge spike magnitude variations. Accordingly, there exists a need for a circuit which overcomes the disadvantages of circuits in the prior art in blanking out the leading edge spike in pulse width modulated current mode switching power supply controllers.

SUMMARY OF THE INVENTION

A current sensing device incorporated into the gate charge current path of the power transistor in a typical pulse-width modulated current mode switching power supply controller provides adaptive leading edge blanking of the current-sense waveform present in the feedback signal to prevent erroneous response in the feedback control circuitry and improve regulation of the power supply output voltage. A serial switch located within the current-sense feedback signal path is directly controlled by the current sensing device to open and close the signal path and generate a blanking interval which is optimally aligned to blank out or remove the leading edge spike in the current-sense waveform which corresponds to the gate charge current pulse that occurs during the turn-on transition of the power transistor. The optimal alignment of the blanking interval is an inherent feature of the current sensing device since the device utilizes the gate charge current pulse to define the timing of the opening and closing of the serial switch. Furthermore, the current sensing device is inherently responsive to variables such as the transistor's Miller capacitance or other manufacturing process and temperature related variations in gate-source capacitance which act to alter the width of the gate charge current pulse, and thus provides a blanking interval which adapts to or is independent of these variables. The width of the blanking interval automatically and dynamically adjusts to accommodate for changes in the leading edge spike of the current-sense waveform that result from the changing width in the gate charge current pulse.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons having the benefit of this disclosure.

Figure 5A:
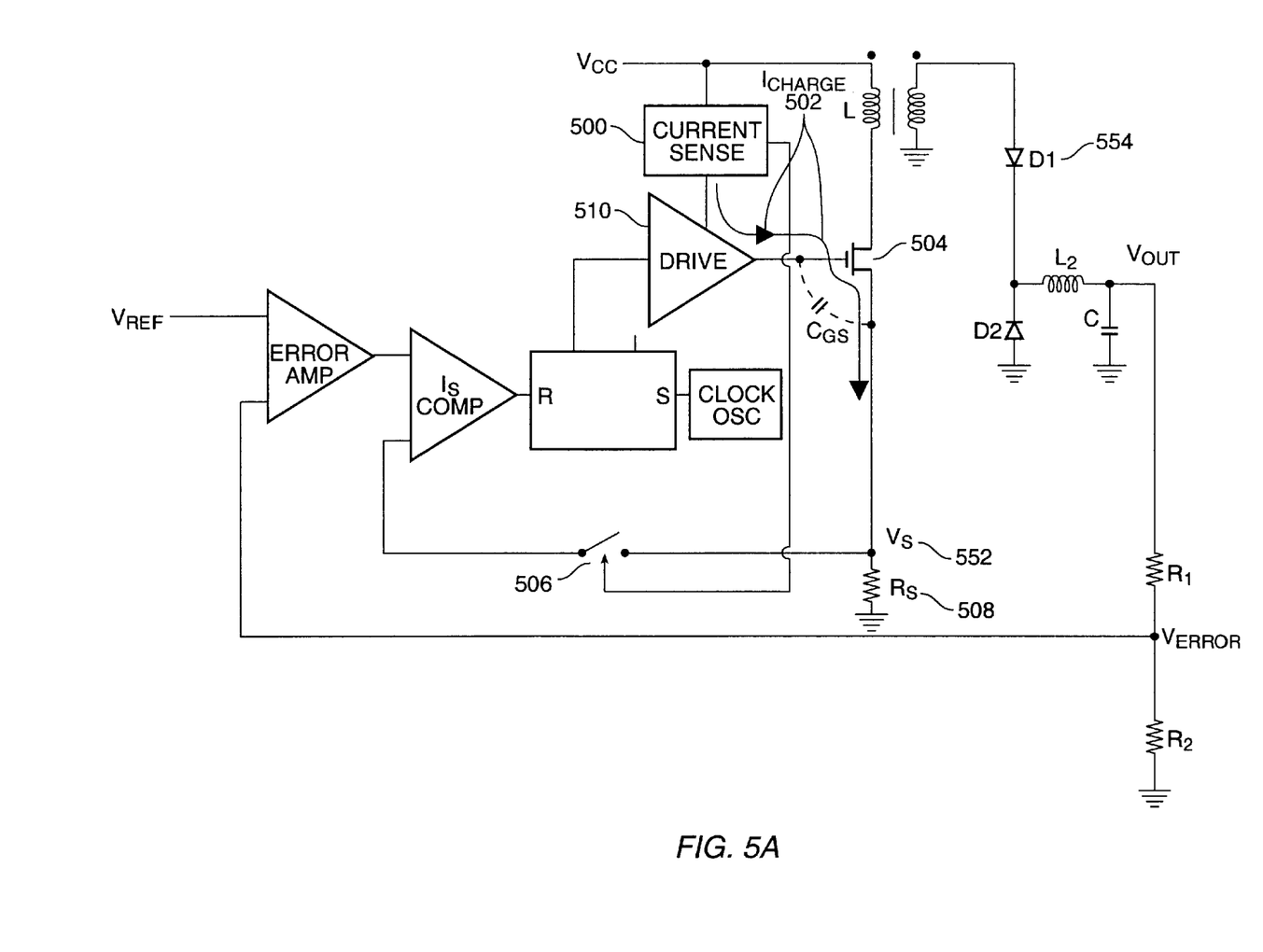
FIG. 5A shows a block diagram circuit of a typical current mode controller commonly used in switching power supplies which incorporates a current sensing device as time domain solution for removing the leading edge spike in accordance with a specific embodiment of the present invention.

A specific embodiment of the present invention is illustrated by the pulse-width modulated current mode switching power supply control circuit of FIG. 5A. The block diagram circuit of FIG. 5A includes a current sensing device 500 incorporated into the gate charge current path ($I_{charge}$) 502 of the MOSFET transistor 504 and a serial switch 506 located in the current-sense feedback path. Generally, the current sensing device 500 controls the serial switch 506 to create a blanking interval which is optimally timed to interrupt the signal in the current-sense feedback path such that the leading edge spike 550 (FIG. 5C) in the current-sense voltage waveform $V_s$ 552 caused by the gate charge current pulse $I_{charge}$ 502 flowing through the current-sense resistor $R_s$ 508 is removed from the current-sense voltage waveform $V_s$ 552. This prevents the leading edge spike 550 from interfering with the proper regulation of the output voltage in the switching power supply.

Figure 5B:
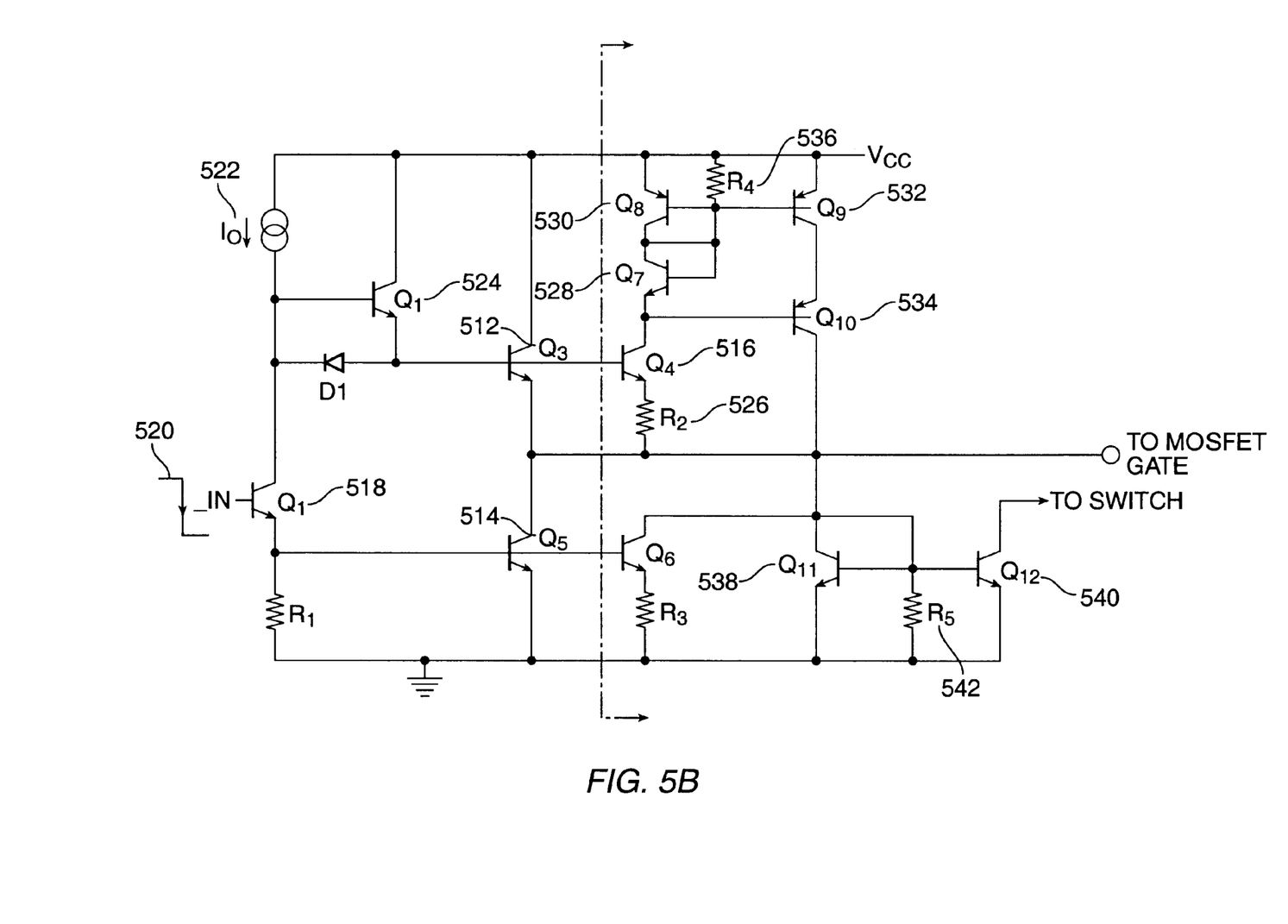
FIG. 5B illustrates the current sensing device and gate driver circuit of FIG. 5A in a configuration particularly suitable for monolithic integrated circuit implementation in accordance with a specific embodiment of the present invention.
Figure 5C:
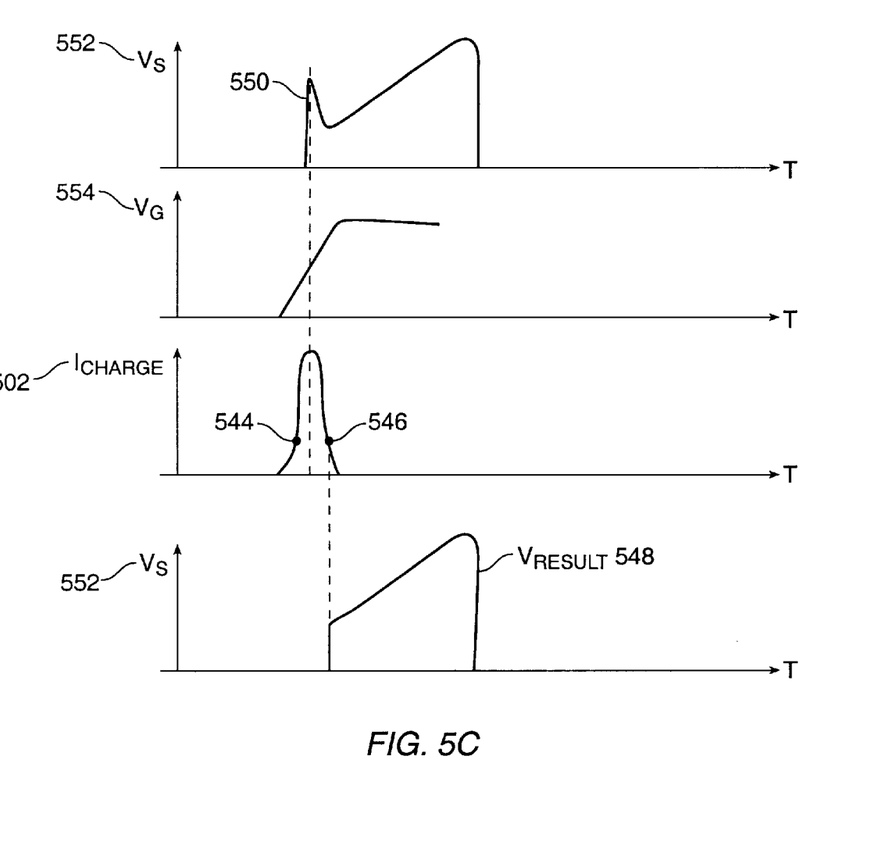
FIG. 5C shows the current and voltage waveforms which illustrate the operation of the current mode control circuit of FIGS. 5A & 5B in accordance with a specific embodiment of the present invention.

More specifically, the known cause and effect relationship between the gate charge current $I_{charge}$ 502 flowing through the current-sense resistor $R_s$ 508 and the leading edge spike 550 in the current-sense voltage waveform $V_s$ 552 is apparent as illustrated in FIG. 5C since the leading edge spike 550 and the gate charge current pulse $I_{charge}$ 502 reach their peak values at the same time. In most practical circuits, this synchronicity is altered very little by other contributing effects to the leading edge spike 550 such as bias conditions in the driver circuitry 510, reverse recovery characteristics of the diode D1 554, transformer parasitics and the Miller effect. Thus, the current sensing device 500 of the present invention senses and utilizes the gate charge current pulse $I_{charge}$ 502 directly as a means to determine the timing of the blanking switch 506. The timing of the blanking switch 506 is therefore inherently linked to the leading edge spike 550 and thus provides an optimally timed blanking interval which removes the leading edge spike 550 from the current-sense voltage waveform $V_s$ 552 as illustrated by $V_{result}$ 548 in FIG. 5C.

The current sensing device 500 from the block diagram circuit of FIG. 5A is represented in a specific embodiment of the present invention in the circuit schematic of FIG. 5B. The circuit of FIG. 5B additionally includes the MOSFET 504 gate driver circuit 510 of FIG. 5A in a configuration which is particularly suitable as a monolithic integrated circuit implementation of both the current sensing device 500 and the driver circuit 510. The current sensing device 500 and the driver circuit 510 are schematically separated by the vertical line in FIG. 5B.

The circuit of FIG. 5B depicts a typical driver circuit 510 for driving the MOSFET gate 504 where devices Q3 512 and Q5 514 are high current transistors with a current capability of approximately 1 to 3 amperes. Initially, transistor Q5 514 is on and holds the MOSFET gate 504 voltage low. The base of transistor Q5 514 is held high by the driver circuit's 510 input transistor Q2 518, which is also initially on. The driver circuit's 510 input transistor Q2 518 turns off when it receives a high to low transition 520, which turns off transistor Q5 514, permitting the MOSFET gate 504 voltage to go high as the constant current source I0 522 pulls the base of Q1 524 and Q3 512 high. The MOSFET gate 504 voltage is typically around 10 volts.

The circuitry for the current sensing device 500 is located to the right side of the vertical line in the schematic diagram of FIG. 5B. This circuitry has two significant functions, the first of which is to sense the gate charge current pulse $I_{charge}$ 502 (FIGS. 5A & 5C). The sensing device is transistor Q4 516. The transistor Q4 516 forms a current mirror with the high current transistor Q3 512, and the Q4 516/Q3 512 emitter area ratio along with the R2 526 resistor value determine the current flow in Q3 512. The collector current of transistor Q4 516 is shaped and mirrored by the non-linear current mirror which includes transistors Q7 528, Q8 530, Q9 532 and Q10 534. Resistor R4 536 ensures that only a portion of the current corresponding to the peak current in the high current transistor Q3 512 is conducted by transistor Q10 534. The collector current of Q10 534 is again mirrored and shaped by another non-linear current mirror which includes transistors Q11 538 and Q12 540 and resistor R5 542. Resistor R5 542 ensures that only a portion of the current corresponding to the peak current in the high current transistor Q3 512 is conducted by transistor Q12 540. The Q12 540 collector current is used to directly drive the blanking switch 506 of FIG. 5A, which is the second significant function of the current sensing circuitry 500. Directly driving the blanking switch 506 with current that mirrors the gate charge current $I_{charge}$ 502 ensures an inherently optimized blanking interval for removing the leading edge spike 550 from the current-sense voltage waveform $V_s$ 552 as depicted in FIG. 5C. The synchronicity between the gate charge current $I_{charge}$ 502 and control of the blanking switch 506 eliminates the impact of the variable propagation delays, td1 and td2 illustrated in FIG. 5A.

The timing and effect of the blanking switch 506 are illustrated by the waveforms in FIG. 5C. Two points on the gate charge current pulse $I_{charge}$ 502 illustrate predetermined levels where the blanking switch 506 is opened 544 and closed 546. The current-sense voltage waveform $V_{result}$ 548 shows the result of the blanking switch 506 on the leading edge spike 550 from the original current-sense voltage waveform $V_s$ 552.

The present invention has the additional advantage of being dynamically adaptive to changes in the width of the gate charge current pulse $I_{charge}$ 502 caused by variables such as the gate-source capacitance of the MOSFET transistor 504. If the gate-source capacitance is increased due to factors such as manufacturing process or temperature variations, the width of the Q12 540 collector current pulse which directly drives the blanking switch 506 varies directly with the changing width of the gate charge current pulse $I_{charge}$ 502. The width of the blanking interval thus widens accordingly to provide optimal blanking which automatically adapts to these changing variables.

Finally, in most practical switching regulator circuits, the Miller capacitance of the chosen MOSFET transistor 504 and other parasitic elements often disrupt the monotonic rise of the gate voltage $V_g$ 554, which inherently leads to the widening of the gate charge current pulse $I_{charge}$ 502. Since the present invention controls the blanking interval with the width of the gate charge current pulse $I_{charge}$ 502, the widening effect of the Miller capacitance on the gate charge current pulse $I_{charge}$ 502 is automatically accounted for and has no effect on the optimum leading edge blanking provided by the circuit and method of the present invention.

Alternative Embodiments

While embodiments and applications of this invention have been shown and described, it would be apparent to those skilled in the art having the benefit of this application that many more modifications than mentioned above are possible without departing from the inventive concepts herein. The invention, therefore, is not to be restricted except in the spirit of the appended claims.

What is claimed is:

1. A circuit for blanking out the leading edge current spike in the feedback path of a pulse-width modulated current mode switching power supply controller, comprising:

a current-sense resistor coupled to a transistor within said feedback path, said current-sense resistor providing a voltage waveform in response to current through said transistor;

a switch coupled to said current-sense resistor within said feedback path, said switch for alternately breaking and re-establishing continuity of said feedback path;

a current sensing device incorporated in the gate charge current path of said transistor for sensing said leading edge current spike and controlling said switch in response thereto, thereby breaking and re-establishing continuity of said feedback path to create a blanking interval optimally positioned such that the leading edge of said voltage waveform corresponding to said leading edge current spike is blanked out and not propagated through said switch.

2. The circuit as recited in claim 1, wherein said current sensing device dynamically adjusts the width of said blanking interval to the minimum amount required to blank out said leading edge of said voltage waveform.

3. The circuit as recited in claim 1, wherein said current sensing device automatically adjusts the width of said blanking interval to accommodate for the widening effect of Miller capacitance of said transistor on said leading edge current spike.

4. The circuit as recited in claim 1, wherein said current sensing device automatically adjusts the width of said blanking interval to accommodate for variations in the gate-source capacitance of said transistor.

5. The circuit as recited in claim 1, wherein said current sensing device automatically adjusts the width of said blanking interval to accommodate for variations in manufacturing process and temperature.

6. The circuit as recited in claim 1, wherein said current sensing device is implemented as a monolithic integrated circuit.

7. A method for blanking out the leading edge current spike in the feedback path of a pulse-width modulated current mode switching power supply controller, comprising the steps of:

providing a voltage waveform in response to current flow through a current-sense resistor coupled to a transistor within said feedback path;

alternately breaking and re-establishing continuity of said feedback path with a switch coupled to said current-sense resistor within said feedback path;

controlling said switch with a current sensing device incorporated in the gate charge current path of said transistor which senses said leading edge current spike and causes said breaking and re-establishing continuity such that a blanking interval is optimally positioned to remove the leading edge of said voltage waveform corresponding to said leading edge current spike from said feedback path.

8. The method as recited in claim 7, wherein said current sensing device dynamically adjusts the width of said blanking interval to the minimum amount required to blank out said leading edge of said voltage waveform.

9. The method as recited in claim 7, wherein said current sensing device automatically adjusts the width of said blanking interval to accommodate for the widening effect of Miller capacitance of said transistor on said leading edge current spike.

10. The method as recited in claim 7, wherein said current sensing device automatically adjusts the width of said blanking interval to accommodate for variations in the gate-source capacitance of said transistor.

11. The method as recited in claim 7, wherein said current sensing device automatically adjusts the width of said blanking interval to accommodate for variations in manufacturing process and temperature.

12. The method as recited in claim 7, wherein said current sensing device is implemented as a monolithic integrated circuit.

* * * * *